United States Patent [19]

Blanck et al.

[11] Patent Number: 5,174,634
[45] Date of Patent: Dec. 29, 1992

[54] NON-PNEUMATIC SPARE WHEEL AND TIRE

[75] Inventors: Timothy C. Blanck; Craig K. Galer, both of Lansing; Patricia M. O'Brien, Leonard, all of Mich.

[73] Assignee: Motor Wheel Corporation, Lansing, Mich.

[21] Appl. No.: 722,970

[22] Filed: Jun. 28, 1991

[51] Int. Cl.⁵ .............................................. B60B 9/00
[52] U.S. Cl. .................... 301/63.1; 301/95; 152/323; 29/894.32
[58] Field of Search .............. 301/62, 63 R, 95–99; 152/1, 5, 11, 12, 323; 305/56, 21, 24; 29/894, 894.3, 894.32, 894.35

[56] References Cited

U.S. PATENT DOCUMENTS

| | | | |
|---|---|---|---|
| 1,820,174 | 8/1931 | Baker | 301/63 R X |
| 4,350,196 | 9/1982 | Hampshire | 152/5 |
| 4,558,727 | 12/1985 | Golata et al. | 152/323 X |
| 4,784,201 | 11/1988 | Palinkas et al. | 152/323 |

FOREIGN PATENT DOCUMENTS

| | | | |
|---|---|---|---|
| 651647 | 9/1937 | Fed. Rep. of Germany | 152/12 |
| 349089 | 5/1905 | France | 152/11 |
| 403505 | 6/1966 | Switzerland | 152/323 |

*Primary Examiner*—Russell D. Stormer
*Attorney, Agent, or Firm*—Barnes, Kisselle, Raisch, Choate, Whittemore & Hulbert

[57] ABSTRACT

A one-piece sheet metal automotive passenger vehicle spare wheel and tire integrated thereon, having a mounting disc and a non-pneumatic tire-supporting rim. The rim has a radially outwardly arched rim portion of toroidal geometry with a generally uniform radius of curvature and cross-section thickness. The rim is cantilevered from the disc and has a radially in-turned flange at its free end thereof extending convergently toward the disc. The disc part has three successively contiguous integral and annularly continuous disc zone portions: (a) a radially outermost generally frusto-conical face zone having air vent openings therein, (b) a radially innermost face zone with an annular hat section protruding outboard of the wheel, and (c) a bolt circle mounting portion adapted for removable mounting to an automotive passenger vehicle wheel hub, axle or other mounting part. The cross sectional thickness of the rim portion is generally less than that of the disc and rim flange. The wheel may be combined with a non-pneumatic elastomeric tire (NPT) having a curved inner surface complimentarily matching and permanently bonded to the outermost surface of the rim. Preferably the NPT of U.S. Pat. No. 4,832,098 is cast and cured onto the wheel rim to form an integrated non-pneumatic spare tire and wheel to replace the pneumatic tire mini-spares currently in use. A die-forming and spin forming method of making the wheel is also disclosed.

16 Claims, 5 Drawing Sheets

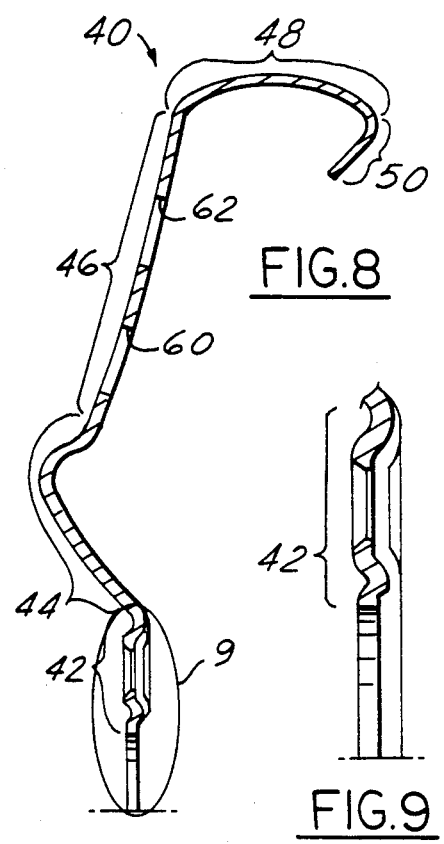
FIG.8
FIG.9
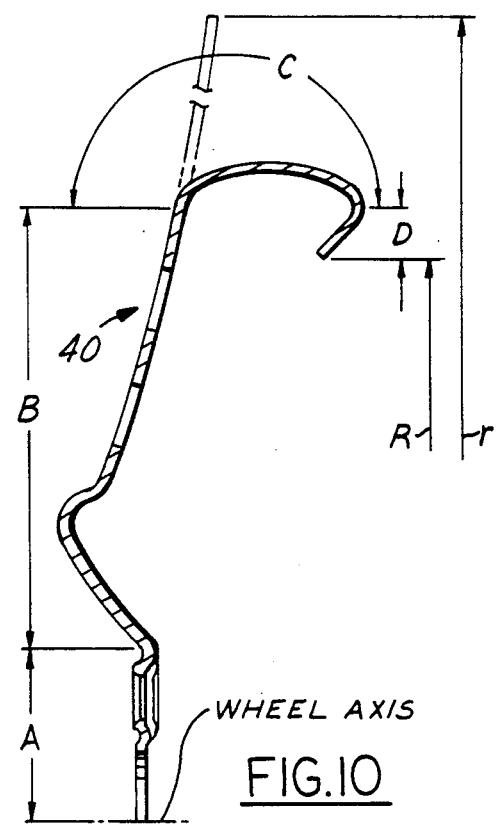
FIG.10
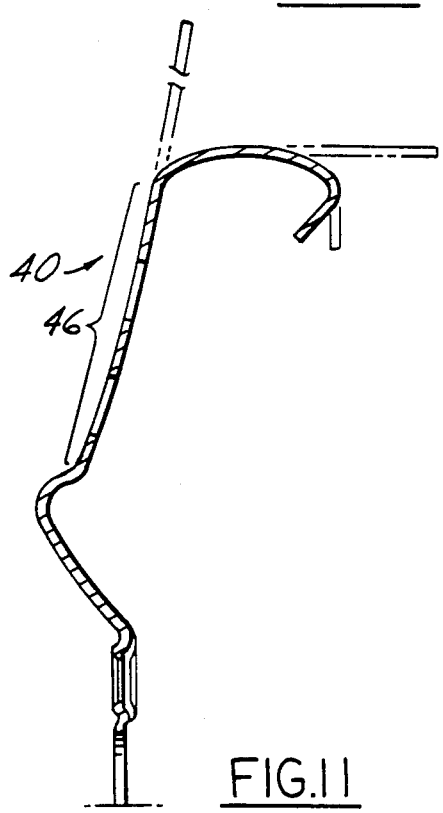
FIG.11
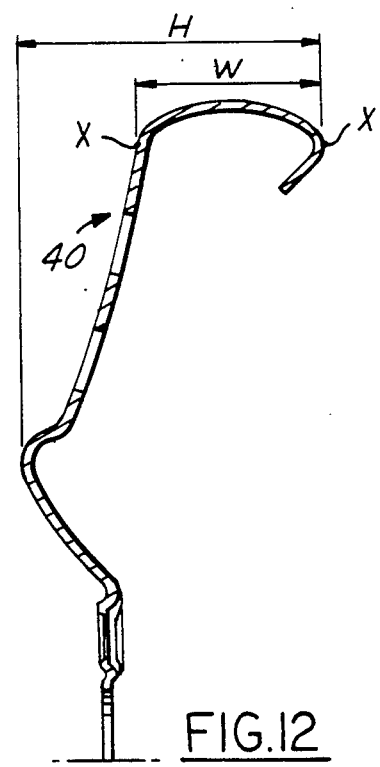
FIG.12

NON-PNEUMATIC SPARE WHEEL AND TIRE

FIELD OF THE INVENTION

The present invention relates to an automotive wheel structure for use in an integrated spare tire and wheel unit for passenger cars, multi-purpose passenger vehicles and light trucks equipped with passenger car pneumatic tires, primarily for use only as a temporary spare tire (and wheel) and only at limited speed.

BACKGROUND

The use of "temporary" wheel-mounted spare tires began in the mid-1970's. This permitted a lowering of spare tire mass and volume as compared to a full size spare pneumatic tire and wheel unit designed for permanent use and capable of meeting all full service passenger vehicle tire and wheel specifications. These so-called "mini-spares", now in widespread use for spare tires, employ a specially-designed pneumatic tubeless tire and specially designed wheel center member of two-piece steel construction on which the tire is mounted. Recognized problems associated with such current pneumatic tire mini-spares include air leakage from the tire while stored in the vehicle trunk-spare compartment which may amount to an unobserved air loss at the rate of 1.5% per month. In addition, although such mini-spares require less trunk space than the full size full service spare tire and wheel and are lighter in weight, there is still a need to further reduce the weight and size of such mini-spares. When such mini-spares are intended to cover a wider range of vehicle wheel and tire diameters, up to for example a 23.875" maximum outer diameter, the weight and volume of current pneumatic tire mini-spares tends to increase dramatically.

Accordingly, there has been much effort in the 1980's to develop a non-pneumatic spare tire (and wheel) design which would solve these problems associated with pneumatic tire mini-spares. One successful result of this effort is the load-bearing non-pneumatic tire ("NPT") disclosed in Palinkas and Page U.S. Pat. No. 4,832,098 issued May 23, 1989, which is incorporated herein by reference. This nonpneumatic spare tire design consists of a rubber tread band bonded to a cast polyurethane or tire body that is, in turn, bonded to a wheel center member. Additional background information on this nonpneumatic tire design is set forth in the article entitled "Non-Pneumatic Tire Technology", appearing in the November, 1990 Issue of *Automotive Engineering*, Volume 98, No. 11 at pages 29-33, by Scott R. Pajtas.

Aside from the need for improvements in temporary spare tire and wheel units for use as mini-spares, long prior to their advent there has been a general need and desire to improve upon, and indeed, to replace conventional pneumatic tire and wheel assemblies which generally comprise a tubeless pneumatic tire removably mounted on a metal wheel. Typically this two piece construction requires that the manufacture of automotive vehicles purchase wheels from one supplier, and the pneumatic tires from another, which requires these components to be manufactured to specifications to insure compatibility of the tire and wheel components. Thus, purchasing costs, including higher freight costs, and costs of mounting pneumatic tires on the wheels, are maximized to the vehicle manufactured, and hence, to its customers. In addition to weight problems, another disadvantage of the conventional pneumatic tire and wheel assembly resides in the pneumatic tire. Conventional pneumatic tires are subject to air loss when the tire is punctured by stones, metal objects, and other sharp objects which are often found on roadways. This, of course, requires that the automotive vehicle carry a spare pneumatic tire and wheel assembly, which decreases the space available for cargo and adds significantly to the weight of the vehicle. Thus, for many years there has a been a need for a non-pneumatic tire and wheel assembly for use in passenger cars and in off-the-road vehicles. Prior efforts toward this goal are exemplified in the Hampshire U.S. Pat. No. 4,350,196 as well as in the prior art patents cited therein.

Of course, in non-automotive passenger vehicle applications, such as in industrial lift trucks, toy vehicles, heavy duty track laying vehicles, such as tanks and similar earth-mover vehicles, non-pneumatic tire and wheel assemblies have long been used. One recent development useful in (but not limited to) this field is disclosed in the Kindel and Rai U.S. Pat. No. 4,950,030, assigned to Motor Wheel Corporation, the assignee of the present invention. A non-pneumatic tire and wheel unit for motorcycle use is also disclosed in French Patent 2,564,040 (published as European Patent Application 0199911 in November 1986).

Such prior art non-pneumatic tire and wheel assemblies, other than that represented in the aforementioned Palinkas and Page U.S. Pat. No. 4,832,098, have not, so far as is known, achieved the mechanical functions and riding performance characteristics of a conventional pneumatic tire and wheel assembly while also meeting the load and vehicle speed ratings, as well as other performance and safety parameters, required for conventional passenger vehicle pneumatic tire and wheel assemblies (such as those set forth in the Federal Motor Vehicle Safety Standards for passenger car use).

OBJECT OF THE INVENTION

Accordingly, it is an object of the present invention to provide a wheel center member for use with a non-pneumatic tire to provide a non-pneumatic mini-spare tire and wheel combination for passenger vehicle use which obviates the reliability problems of pneumatic tires used on current mini-spares, requires less trunk space and also provides weight reduction compared to current pneumatic mini-spares.

Another object is to provide a wheel structure and integral non-pneumatic tire tread thereon capable of use as a spare tire unit on automotive passenger vehicles in which the wheel structure is manufactured in one-piece from metal, preferably steel, and wherein the strength-to-weight ratio of the wheel structure is improved over prior designs, is compatible for use with the aforementioned Palinkas and Pages non-pneumatic tire of U.S. Pat. No. 4,832,098 as well as other non-pneumatic tire designs, and which also has the capability of replacing conventional pneumatic tire and wheel assemblies intended for full-rated passenger vehicle to thereby eliminate the need for vehicle to carry spare tires.

BRIEF DESCRIPTION OF THE DRAWINGS

The foregoing as well as other objects, features and advantages of the present invention will appear more fully from the following detailed description, when taken in conjunction with the accompanying scaled drawings, wherein:

FIG. 8 is a cross-sectional view taken on the line A—A of FIG. 4, with two of the vent holes of the inner and outer circular rows of vent holes projected to the left of the main view of FIG. 8 and rotated 90° to illustrate these holes in elevation.

FIG. 9 is a cross-sectional view representing an enlargement of the area circled 9 in FIG. 8 with a portion of the wheel structure out of the plane of the section also illustrated to better define the mounting plane structure of the wheel.

FIGS. 10-19 are semi-schematic fragmentary center sectional views illustrating, in conjunction with the associated descriptive text, various design parameters and method steps employed in the construction of a preferred embodiment of the wheel center member of the invention.

DESCRIPTION OF THE PREFERRED EMBODIMENTS

Figure 1:
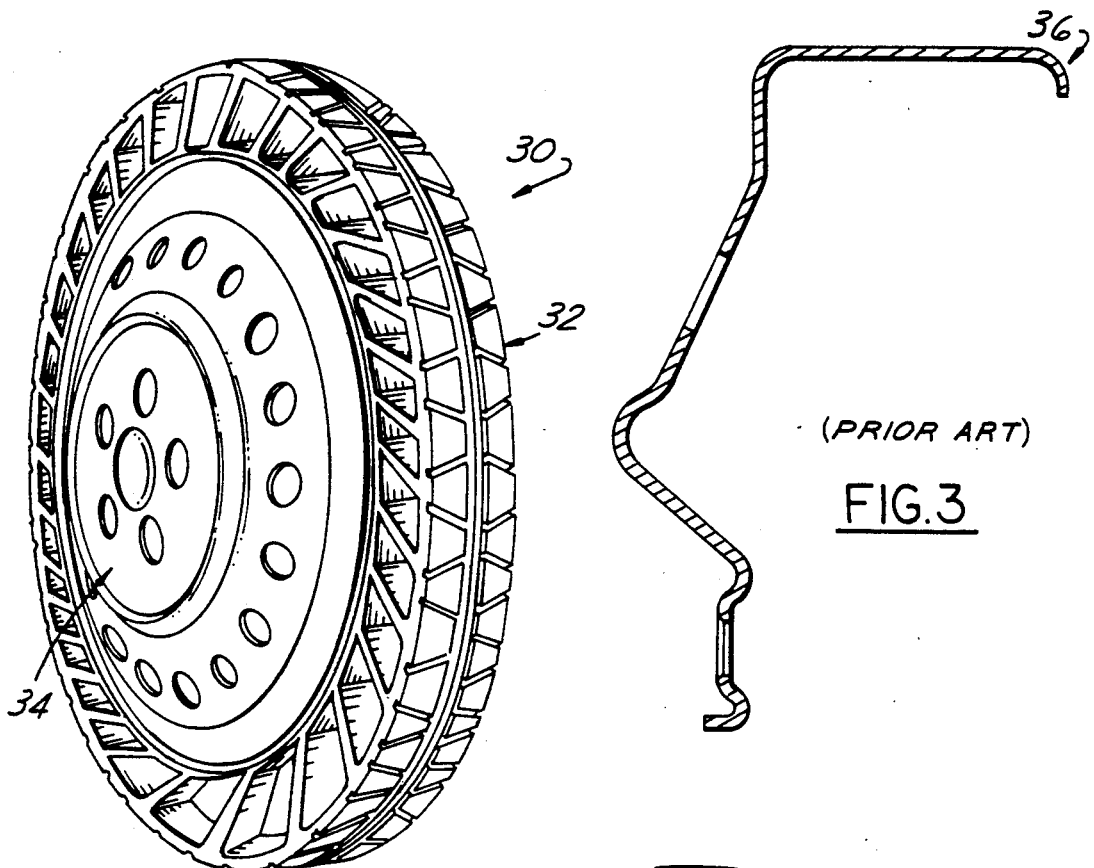
FIG. 1 is an illustration in perspective of the outboard (street side) of one prior art test embodiment of a nonpneumatic tire and wheel unit intended as a mini-spare replacement constructed in accordance with the Palinkas et al U.S. Pat. No. 4,832,098.

Referring in more detail to the accompanying drawings, FIG. 1 is an illustration of a non-pneumatic spare tire and wheel assembly 30 made up of a non-pneumatic tire 32 ("NPT") molded in-situ on a steel wheel center member 34 designed for test purposes with respect to tire 32. Tire 32 is constructed in accordance with the Palinkas et al U.S. Pat. No. 4,832,098, which is incorporated herein by reference, and is the preferred form of construction for the non-pneumatic tire employed on the wheel center of the present invention.

Figure 3:
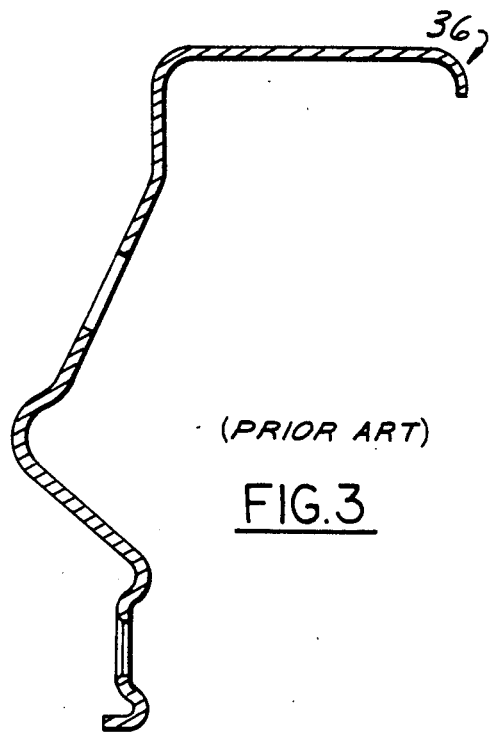
FIG. 3 is a center cross-sectional view of a prior art wheel center member proposed for commercial use as the wheel center member of the unit of FIGS. 1 and 2, only a half section being illustrated inasmuch as the wheel center member is a body of revolution with the other half-section having the same mirror-image contour.
Figure 2:
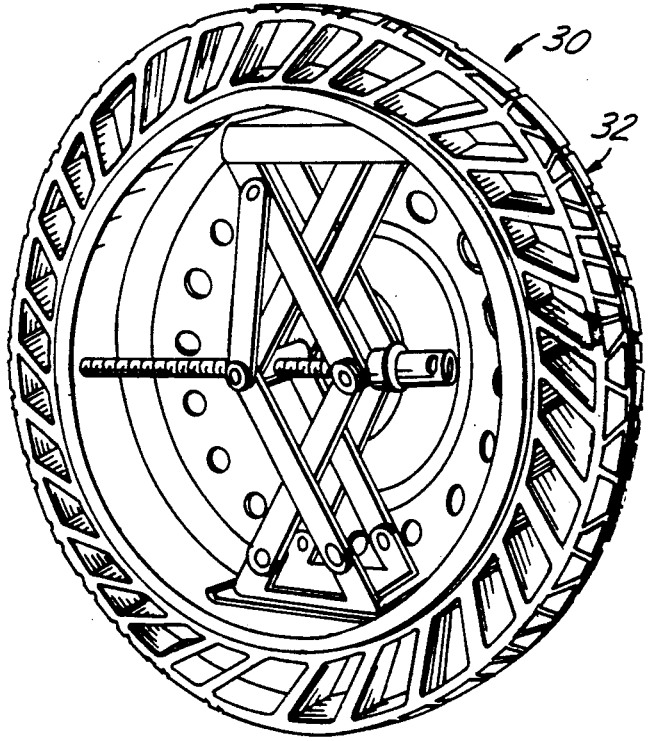
FIG. 2 is an illustration of the inboard side of the tire and wheel unit of FIG. 1 and illustrating the mounting of a vehicle double scissors jack within the space provided by the interior or inboard cavity of the wheel center member of the unit.
Figures 2A, 2B:
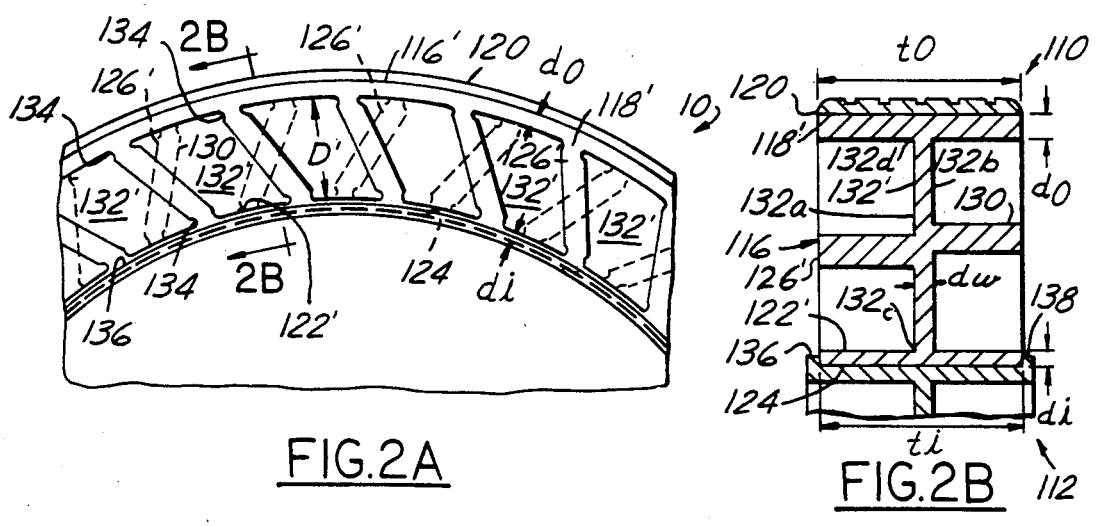
FIG. 2A is a reproduction of FIG. 2 of the aforementioned prior art Palinkas and Page U.S. Pat. No. 4,832,098, and hence is a fragmentary elevational view of a portion of the annular body of the non-expansible non-pneumatic tire ("NPT") of the '098 patent mounted on a wheel rim, showing oppositely directed planar ribs formed integrally with a central planar web member and inner and outer cylindrical members ("hoops") which in combination coact as a unit construction to function as the NPT.
FIG. 2B is a reproduction of FIG. 3 of the aforementioned prior art Palinkas and Page U.S. Pat. No. 4,832,098, and hence is a sectional elevational view taken along the line 2B—2B of FIG. 2A, showing the central web member integral with the ribs which run on either side and form the inner and outer hoops below and above.

Referring in more detail to FIGS. 2A and 2B, wherein the reference numerals utilized are those appearing in FIGS. 2 and 3 respectively of the Palinkas et al '098 patent but raised by a factor of 100, tire 32 may generally comprise the NPT 116' of the '098 patent as described and illustrated therein. Thus, in general, the NPT tire 116' preferably comprises an annular body of resilient elastomeric material, preferably polyurethane, and consists a generally cylindrical outer member or hoop 118' at the outer periphery of the body, a generally cylindrical inner member or hoop 122' spaced radially inward from and coaxial with outer hoop 118'. A plurality of axially extending, circumferentially spaced-apart first and second rib members 126' and 130 are connected at their corresponding inner and outer ends respectively to inner and outer cylindrical hoops 122' and 118'. The rib members 126' and 130 are generally inclined at substantially equal angles of about 15° to 75° to radial planes which intersect them at their inner ends. A unitary circumferential web member 132' is disposed between the two sets of ribs 126' and 130 and has its inner and outer peripheries connected respectively to said inner and outer cylindrical hoops 122' and 118'. Web member 132' is connected on one side face to the first rib members 126' and on the other side face to the second rib members 132. The first rib members 126' are inclined oppositely to the second rib members 130 with respect to the radial planes to thereby form with the inner and outer cylindrical members and the web member a load-carrying structure in which locally loaded members are enabled to buckle.

Web member 132' is planar, is perpendicular to the rotational axis of the tire 116' and is positioned about half way intermediate the axial ends of the cylindrical hoops 118', 122', and each of the rib members 126' and 130 extends axially from the associated opposing side faces of the web member 132'. Rib members 126' and 130 are undercut at each end of each rib at least in the acute angle where each rib joins the inner and outer cylindrical hoops 118', 122'. The outer cylindrical hoop 118' has secured to its outer surface a circumferential tread 120, and the inner cylindrical member has secured to its inner circumferential surface 124 the wheel rim part 112. The tread 120, annular NPT body 116' and wheel rim part 112 thus form an integral tire and wheel structure.

Tire 32 as shown in FIGS. 1 and 2 also preferably incorporates three of the four vibration-reducing improvement features disclosed in Palinkas et al U.S. Pat. No. 4,784,201, i.e., (1) tire 32 has an outer tread surface with a crown radius; (2) the tread has a pattern with a plurality of circumferential grooves and lateral grooves arranged to reduce uneven contact pressures caused by radial forces carried by the tire ribs, and (3) the spacing of the ribs is randomly varied around the circumference of the tire to broaden a vibration spectrum caused by the ribs and reduce peak vibrations. The wheel center 34 assembly 30 of FIGS. 1 and 2 was constructed solely for NPT test purposes and is not intended to satisfy the various cost and performance parameters of a wheel center intended for mounting on the axle hub of automotive passenger vehicle in actual service.

Figure 6:
Figure 7:

FIG. 3 is believed to illustrate one prior art effort to design and construct a wheel center member 36 for commercial use with the tire and wheel assembly 30 wherein the center 36 was to be substituted for center 34. Wheel center member 36 as shown in FIG. 3 is also shown in, and described with reference to, FIG. 6 of the aforementioned Palinkas et al U.S. Pat. No. 4,784,201 (see column 7, lines 53-64). So far as it is known, a tire and wheel assembly utilizing the non-pneumatic tire 32 integrally molded onto wheel center 36 did not successfully pass test specifications deemed acceptable for passenger vehicle wheel fatigue life even for mini-spare use.

In accordance with the present invention a wheel center support member 40 (hereinafter "wheel") was designed in an effort to optimize the strength-to-weight ratio of the wheel while satisfying the service loading requirements for passenger vehicle use in a non-pneumatic tire and wheel assembly intended as a replacement for a pneumatic mini-spare. This resulted in the wheel design 40 illustrated in FIGS. 4-9. FIGS. 4-9 are a reproduction from scaled engineering drawings and disclose thereon the dimensions (in millimeters) as well as the other geometric specifications as initially conceived to meet this goal. As will become evident subsequently herein, most of the dimensions and geometric parameters specified in FIGS. 4-9 remain representative of a wheel center as actually constructed pursuant to this design and illustrated in cross-section as wheel 40' in FIG. 20.

Figure 4:
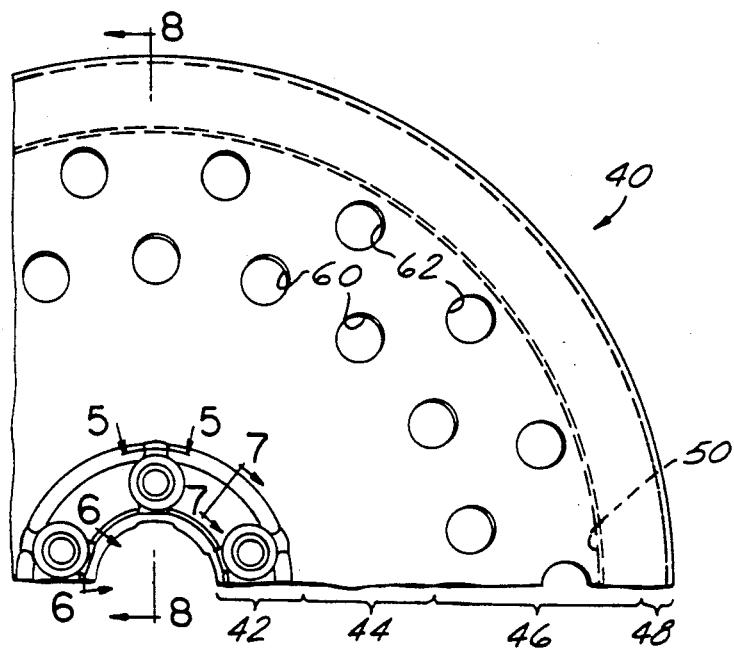
FIG. 4 is a fragmentary elevational view of the outboard side of one embodiment of a wheel center member constructed in accordance with the present invention.
Figure 5:
FIGS. 5, 6 and 7 are fragmentary cross-sectional views taken respectively on the lines 5—5, 6—6 and 7—7 of FIG. 4.
Figure 14:
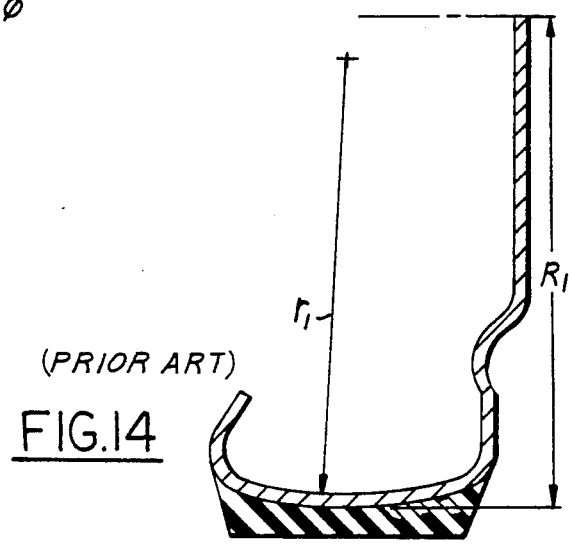
Figure 15:
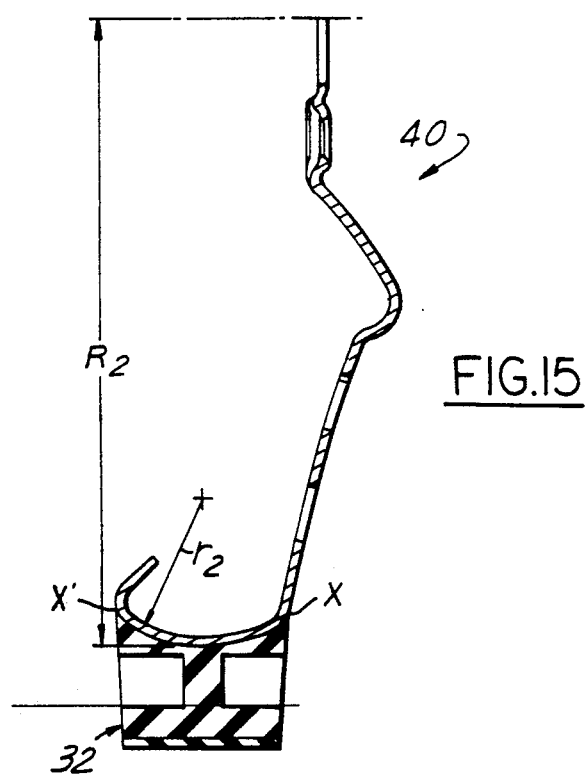

For purposes of descriptive analysis, wheel center 40 may be subdivided into five successively contiguous annular zones consisting of, as indicated in FIGS. 4 and 8, the bolt circle mounting portion 42, the "face" of the wheel center 40 consisting of the two contiguous zones 44 and 46, the rim zone 48 (the urethane non-pneumatic tire 32 being integrally molded to the outer periphery thereof, see FIG. 15), and an inboard free-edge flange portion 50 which extends radially inwardly of the wheel from rim portion 48 and is inclined in an outboard direction as illustrated in FIG. 8. The interelationship of contour, thickness and other structural parameters of zones 42-50, and the manner of forming the ultimate configuration of a working embodiment of the invention illustrated as wheel 40' in FIG. 20, will be better understood from a description of such various parameters as illustrated semi-schematically in FIGS. 10-19, as well as the comparison therein to the wheel construction illustrated in FIGS. 1-4 of the Kindel U.S. Pat. No. 4,950,030, which is also incorporated herein by reference.

The non-pneumatic spare wheel 40 of the invention as represented and specified in FIGS. 4-9 is designed to provide a single piece part capable of meeting the weight, volume and strength requirements for a non-pneumatic spare tire and wheel assembly utilizing a non-pneumatic urethane tire 32 for a wheel diameter approximately of that specified in FIG. 8, a maximum loading of 505 kilograms force, a weight less than 10.45 kilograms (23 pounds). Wheel 40 is also intended to be capable of meeting the radial and rotary fatigue test requirements currently specified for pneumatic tire mini-spares in commercial use, sufficient impact resistance to withstand pot hole testing and at a cost competitive with pneumatic mini-spares. Wheel 40 also is intended to accommodate placement of a single scissor jack in the inboard center cavity of the wheel in a manner similar to that shown in FIG. 2.

Figure 16:
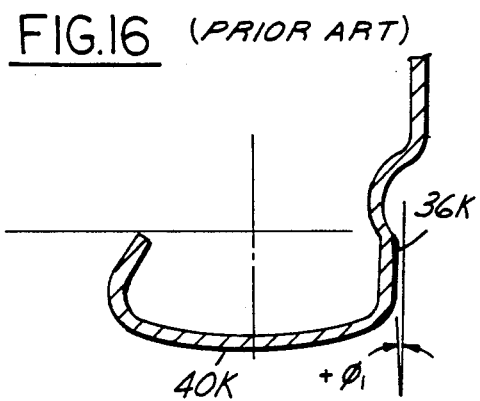
Figure 17:
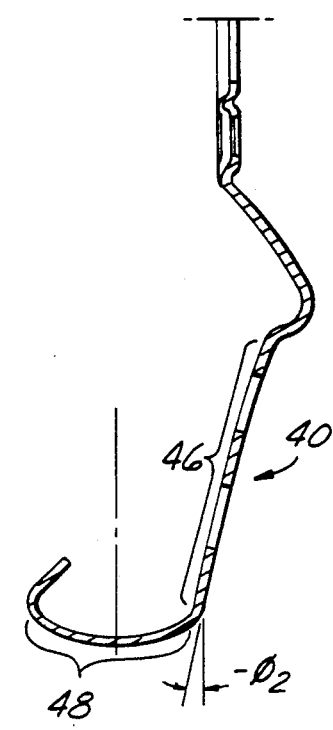
Figure 18:
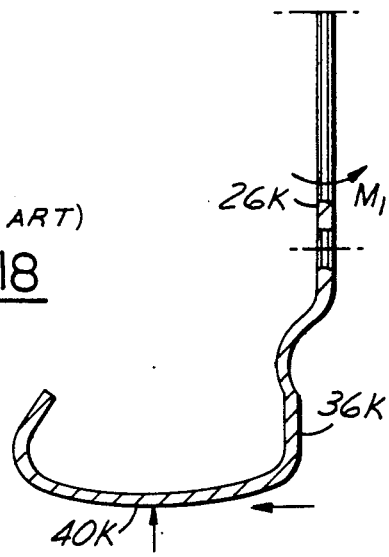
Figure 19:
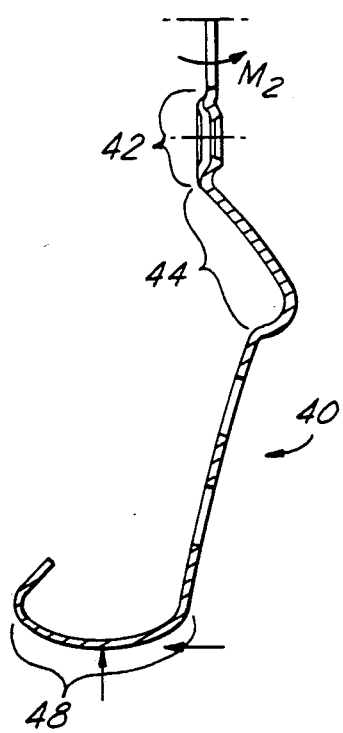
Figure 20:
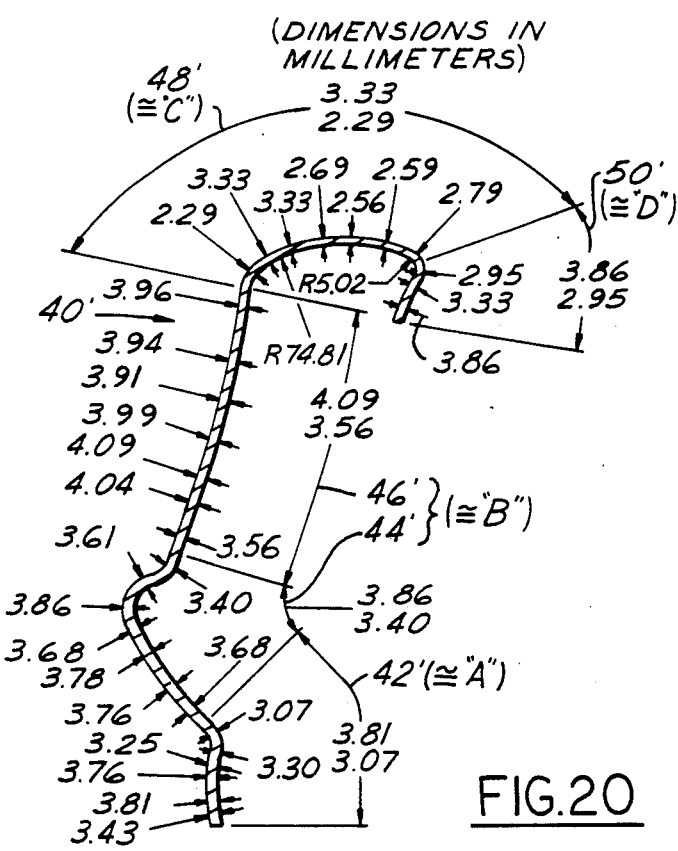
FIG. 20 is a half center section of one preferred embodiment of a wheel center member as made and successfully tested in accordance with the principles of the present invention.

In order to accomplish the foregoing design parameter goals, wheel 40 (and its actual realization in the form of wheel 40') of the invention features a varying cross-sectional thickness in the five zones 42-50 as best seen and specified in FIG. 20 in order to optimize the strength-to-weight ratio of the wheel. FIG. 20 illustrates and specifies the zones and final material cross-sectional thickness in millimeters at the illustrated measurement points in each of these zones. Referring in more detail to FIGS. 10-19, the non-pneumatic spare wheel 40 is illustrated semi-schematically therein in FIGS. 10, 12, 13, 15, 17 and 19. FIGS. 14, 16 and 18 are semi-schematic illustrations based on FIGS. 1, 2 and 4 of the prior art Kindel and Rai U.S. Pat. No. 4,950,030, for comparison purposes. In FIG. 10 the mount area is labeled "A" therein and corresponds to zone 42 in FIG. 8, which in the corresponding zone 42' of wheel 40' (FIG. 20) ranges from about 3.07 to 3.81 mm in cross-sectional thickness. The face area labeled "B" in FIG. 10 corresponds to zones 44 and 46 in FIG. 8. As specified in FIG. 20, the corresponding zones 44 and 46' range respectively from about 3.40 to 3.86, and from about 3.56 to 4.09, millimeters in cross-sectional thickness. The rim area labeled "C" in FIG. 10 corresponds to zone 48 in FIG. 8 which in the corresponding zone 48 of wheel 40' ranges in thickness from about 2.9 to 3.33 millimeters, and is the thinnest zone of the wheel.

The flange area "D" as labeled in FIG. 10 corresponds to zone 50 in FIG. 8, and thickens back up. In the corresponding zone 50' of wheel 40' the thickness ranges from about 2.95 to 3.86 millimeters. The highest Von Mises stresses on a theoretical constant thickness rim FEA model, following the schematic contour of FIG. 10, are seen in the flange area "D" of FIG. 10, which corresponds to the flange zone 50 of FIG. 8. Since curling this flange from an initial partially die-form blank radius "r" (FIG. 10), wherein the rim and flange forming material is indicated in phantom as a radially outward extension of face "B", to a final spin-formed radius "R" indicated in FIG. 10 requires a reduction in surface area, an increase in stock thickness is allowed to occur by following the geometric principles of volume constancy. The spin-formed reduction in stock thickness through the rim area "C" (zone 48) is provided in accordance with the present invention to reduce the overall weight of wheel 40 while strengthening this zone by work hardening.

It is to be understood that the cross-sectional scaled view of wheel 40' in FIG. 20 is taken in a plane that extends radially of wheel 40' and includes the axis of rotation of wheel 40' ("wheel axis" in FIG. 20). Moreover, the individual cross-sectional thickness measurement as specified in FIG. 20 remain substantially constant circumferentially of wheel 40' at the radial distance from the wheel axis where each measurement location is specified in FIG. 20.

Referring to FIG. 11, in accordance with the best mode of making and using the invention presently known to the inventors, sheet steel material is die-formed in a conventional progressive die stamping operation, starting from a flat circular blank and progressing to the partially formed circular part schematically illustrated as stage ① in FIG. 11. At this stage the mount area A and face area B of FIG. 10 has been fully and finally die formed.

Then a commercially available numerically controlled shear spinning machine is employed to form the rim and flange zones C and D (zones 48 and 50 respectively, of FIG. 8). A series of controlled progressive working passes with the spinning roller of the machine is employed in the sequence illustrated in FIG. 11 as steps ②, ③ and ④. In the first spinning operation, the peripheral blank material indicated in phantom FIG. 10 is folded over so as to extend axially of the wheel. This spinning operation is performed against a suitably contoured back-up mandrel in conventional shear-spinning fashion.

The next spinning operation to progress from form ② to form ③ as illustrated in FIG. 11 constitutes a "tipping" radially inwardly of the cylindrical edge of the flange as made in the second operation (stage ②), and utilizes a back side rim-contour roller for back up to the spinning roller. Stage ④ of the spinning operation, labeled "Flange Angle Curl in FIG. 11" results from a numerically controlled free air-spinning operation, with the back-up rim contour roller removed, to thereby form the flange area "D" of FIG. 10 (flange zone 50 of FIG. 8, and more particularly, flange 50' of FIG. 20).

It is to be understood that the rim zone 48' is preferably retained in its imperforate as-spun state in the finished product. However, when paint coating the finished product in EDP processing, two small diametrically opposite drain holes have been provided generally centrally of the rim portion 48', i.e., suitably located to allow gravity paint drainage from the lowest portion of the product at EDP removal from the EDP tank and to vent air from the uppermost part portion during tank submission of the part.

The axial dimension "W" (FIG. 12) of rim area "C" (zone 48) of wheel 40 is held to limits specified for further processing of the wheel after it is made and then placed in a suitable mold wherein the non-pneumatic urethane tire 32 is centrifugally cast and cured in-situ to bond its inner periphery to the outer peripheral surface of the rim 48 (48'), as illustrated semi-schematically in FIG. 15. Referring to FIG. 12, in order for the wheel 40 to properly fit into the tire casting machine (made in accordance with the Palinkas et al U.S. Pat. No. 4,832,098), the width specification "W" and the overall height specification "H" parameters for this machine must be observed. The width dimension "W" is maintained for the aforementioned centrifugal casting mold so that the wheel will properly seal at the surfaces labeled "X" and "X'" in FIG. 12. It has been found that the width tolerance "W" could be obtained utilizing the aforementioned numerical controlled spinning machine. However, in order to achieve the overall minimum height "H" specified for this tire casting machines, this dimension had to be reduced from the as-spun condition of the wheel by "squeezing" the wheel axially, e.g., flattening the wheel slightly by utilizing a small hydraulic press to permanently bend or deform the wheel to achieve the specified "H" dimension.

Figure 13:
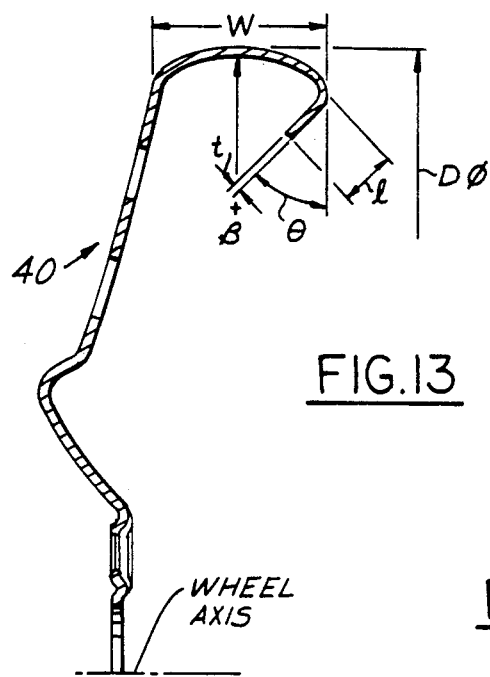

Referring to FIG. 13, another parameter to maintain in accordance with the invention is the ratio of flange length to flange thickness in the flange area "D" of FIG. 10 (zone 50). The minimum value of the length dimension of flange portion 50, which is the dimension labeled "l" in FIG. 13 taken in the plane of the drawing of FIG. 20, is believed to be critical for optimizing the strength-to-weight characteristics of wheel 40, particularly in its ability to withstand service loading radially of the wheel. On the other hand, the maximum value of flange length "l" should be reduced as much as possible to reduce weight of the wheel and also to improve manufacturability of the wheel. The empirical results obtained thus far are specified in wheel 40' of FIG. 20. Moreover, referring further to FIG. 13, and although not as yet determined, a mathematical relationship is believed to exist between the flange length (l), flange thickness (t), wheel diameter (D$\phi$), flange angle ($\theta$) (relative to a radial plane perpendicular to the axis of the wheel), the radius of curvature ($\beta$) of the rim area "C" (zone 48) of the wheel and the rim width (W). Investigation continues in this respect.

Referring to FIGS. 14 and 15, another parameter of wheel 40 to be optimized in accordance with the present invention is the rim contour radius of curvature. Preferably, a torodial rim design in accordance with the teachings of Kindel et al U.S. Pat. No. 4,950,030 is employed in wheel 40 in accordance with the present invention to assist in optimizing the strength-to-weight ratio of the overall wheel. However, for the loading conditions of the non-pneumatic tire and wheel assembly 40 and 32 of FIG. 15, maximum loading is seen at the center or apex area of "C" (FIG. 10) (zone 48) due to the construction of the non-pneumatic tire 32 of the Palinkas et al U.S. Pat. No. 4,832,098 preferably employed in this wheel and tire assembly of the present invention. This concentrated loading is indicated by the circled area in FIG. 15. By contrast, the loading of the illustrative track laying wheel embodiment exemplified in FIGS. 1-4 of the Kindel et al '030 patent represents a distributed loading as indicated schematically in FIG. 14. Hence a smaller radius of curvature ($r_2$) is employed in wheel 40 as compared to the larger radius of curvature ($r_1$) illustrated in FIG. 14. Hence the aspect ratio ($r_1/R_1$) of the prior art wheel embodiment 20 of the Kindel et al patent '030 illustrated in FIGS. 1, 2 and 4 thereof, indicated as 0.945 in FIG. 14, becomes in wheel 40 of the present invention an aspect ratio ($r_2/R_2$) of about 0.233 as illustrated by the respective calculations set forth in FIG. 15.

Another factor to take into consideration in accordance with the present invention is the "side wall slope" of wheel 40. Referring to FIG. 17, the conical angle ($\phi_2$) of the generally frusto-conical outer face zone 46 (FIG. 8) of wheel 40 relative to a plane taken radially of the wheel, as the same leads into the rim area "C" of FIG. 10 (zone 48), progressing radially outwardly of the wheel, is in a direction converging toward the inboard side of the wheel (indicated as a negative angle in FIG. 17). By comparison, in the heavy duty wheel exemplary embodiment of the Kindel et al '030 patent schematically illustrated in companion FIG. 16, the face 36K of the wheel in the area adjoining the rim portion 40K (corresponding to reference numerals 36 and 40 in FIGS. 4 and 2 of Kindel '030) has a conical angle ($\phi_1$) in the range of 3°-7° with face 36K being inclined in a direction, progressing radially outwardly of the wheel converging toward the mounting plane of the wheel, i.e., in a direction (indicated as a positive angle ($\phi_1$) in FIG. 16) opposite to that of the face portion 46 in FIG. 17. In other words, face portion 46 of wheel 40 generally defines an obtuse angle with the rim zone 48, whereas the conical disc face 36 "K" and rim 40K in FIG. 16 define an acute angle there between. The conical slope angle of zone 46 of wheel 40 can be varied along the face from approximately 14° to 16° in the preferred embodiment disclosed herein, although wider variance in this angle may be tolerated to cover other non-pneumatic tire and wheel assembly applications. The "offset" dimension of wheel 40 provided by this inclination of face zone 46 thus accommodates the clearance requirements for the brake package indicated in phantom in FIG. 8 (e.g., "1991" "N Car Max ABS Caliber"; see offset dimension of 42 millimeters in FIG. 8).

As best seen in FIGS. 4 and 8, wheel 40 of the present invention preferably has two circumferentially extending rows of circular vent holes made up of holes 60 defining a radially inner row and holes 62 defining a radially outward row of vent holes. Holes 60 and 62 in these two rows are preferably staggered relative to one another circumferentially of the wheel as illustrated in FIG. 4. Placement of these vent holes is preferably as specified in FIGS. 4 and 8. As will be seen in FIG. 20 and discussed subsequently herein, face zone 46 containing vent holes 60 and 62 represents the thickest range of stock thickness in wheel 40. Zone 46 thus has sufficient strength to accommodate the material removal represented by vent holes 60 and 62, which in turn reduce the weight of the wheel and provide the required through-wheel air ventilation for the brake package. In addition, vent holes 60 and 62 assist in overall strengthening of the wheel by imparting increased flexibility to better accommodate service loading stresses in zone 46 of the face 44-46 of wheel 40.

Referring to the companion schematic illustrations of FIGS. 18 and 19, the contour of the wheel 40 (FIG. 19) of the present invention may be readily here compared to that of the illustrative embodiment of FIGS. 1, 2 and 4 of the Kindel et al '030 patent (FIG. 18). The bolt circle mounting zone 42 of wheel 40, indicated generally as the mount area "M$_2$" in FIG. 19, as well as the "hat" zone 44, are substantially different in contour and construction from the mounting area of the hub mounting portion 26K, indicated generally as "M$_1$" in FIG. 18. In wheel 40 the passenger car wheel hat contour of zones 42 and 44 of wheel 40 provides clearance for the brake caliper package and also separates radial and circumferential stresses between the mounting zone 42 and the rim zone 48. It has been found that a passenger car size bolt circle, as represented by zone 42 of wheel 40, as contrasted to the track laying size illustrated in the prior art wheel of the Kindel et al '030 patent, could nevertheless handle the bending moment loads placed on wheel 40 under cornering stresses encountered in highway road wheel use even though the diameter of the bolt circle "M$_2$" (FIG. 19) is much smaller than that of the bolt circle "M$_1$" (FIG. 18).

Referring again to FIG. 20, it is to be understood that this figure is reproduced to scale from an actual wheel 40' made and tested pursuant to the principles of the present invention as described hereinabove. Although for the most part wheel 40' follows the design concepts envisioned for wheel 40 as illustrated and specified in FIG. 8 relative to cross-sectional contour and cross-sectional thickness of the wheel, it has been found that in manufacture certain deviations in the specifications of FIGS. 4–8 do occur and should be made. These deviations are indicated by following the actual cross-sectional thickness measurements represented and plotted in FIG. 20 versus FIG. 8, and by the revisions in radius of curvature of rim zone 48 versus 48' as well as by the revisions in curvature and thickening occurring in the flange zone 50' of wheel 40' versus zone 50 of wheel 40.

For the particular wheel size embodiment represented in FIG. 20, and as specified in FIGS. 4–9, and provided with a non-pneumatic tire 32 as schematically illustrated in FIG. 15 pursuant to the disclosure of the Palinkas et al '098 patent, the non-pneumatic spare tire and wheel assembly 32/40' working embodiment of the present invention has achieved success in meeting or exceeding the aforementioned goals for this product, and particularly for this mini-spare application. In one successful working embodiment of a wheel center member 40 constructed pursuant to the foregoing description as specified in FIGS. 4–9, as modified by the deviations specified in FIG. 20, the following improved results have been obtained:

Non-Pneumatic Spare Wheel and Tire (40/40'/32):
I. Weight: 4.9 lb savings = 14% Savings: e.g., cf.;
    A.  16 inch wheel & pneumatic tire
        (mini-spare) equivalent tire & wheel
        spec . . . T155/70-R16:
    Wheel       20.5 lbs
    Tire        13.6 lbs
                Total 34.1 lbs
                vs.
    B.  20.5 inch NPT spare wheel (40/40'/32):
    Wheel       21.2 lbs
    Tire         8.0 lbs
                Total 29.2 lbs
II. Space: 50% Savings; cf.;
    A.  Pneumatic Mini-Spare
        (T155/70R16) = 2,879 in$^3$
                vs.
    B.  NPS (40/40'/32)
        (Wheel/Tire (Urethane) = 1,435 in$^3$
III. Testing Results
    For NPT spare wheel (40/40'/32):
                Load            Cycles
    Radial      1,111 lbs       9,483,000
    Rotary      (1,585 ft.lbs.) 70,146
                2,150 NM
IV. Height: "H" = 4.628 max. (1117.56 mm)

From the foregoing description it will now be apparent that the improved wheel center 40/40' of the present invention is particularly well suited for use with a non-pneumatic tire 32 bonded thereto to form a permanent tire and wheel assembly, and more particularly for a mini-spare wheel and tire application since it provides significant advantages over the present commercially available pneumatic tire mini-spares currently in widespread use. These advantages include an overall package configuration which is more compact for trunk storage in the vehicle, lower weight, competitive cost, and elimination of the air leakage and puncture problems of the pneumatic tire mini-spares. It is also believed, although not yet proven, that the present invention will provide substantially improved service life over that provided by present commercial pneumatic mini-spares, which in turn will enable increased safety ratings for highway speed and distance traveled before it is necessary to remove and replace the non-pneumatic mini-spare of the invention with a new conventional pneumatic tire/wheel assembly. Indeed, it is envisioned that the non-pneumatic spare tire and wheel assembly of the invention will be enhanced to the point of enabling the use of the same to replace conventional pneumatic tire and wheel assemblies, both on driven and undriven vehicle axles, i.e., on all "four corners" of the vehicle, which in turn will eliminate the need for the vehicle to carry a spare tire.

It will also be understood that, although the foregoing description and drawings describe and illustrate in detail one successful working embodiment of the invention, and the best mode presently known to the inventors of making and using the same, to those skilled in the art to which the present invention relates the present disclosure will suggest many modifications and constructions as well as widely differing embodiments and applications without thereby departing from the spirit and scope of the invention. The present invention, therefore, is intended to be limited only the scope of the appended claims and the applicable prior art.

We claim:

1. A support wheel for a vehicle comprising a vehicle mounting disc part and a tire-supporting rim part, said rim part having a radially outwardly arched rim portion of toroidal geometry, said rim portion toroidal geometry being defined by a radially outermost surface of said rim portion having a generally uniform radius of curvature taken in radial cross section in a plane including the axis of rotation of said wheel and being generally symmetrical about an apex of the arch of said toroidal rim portion, said rim part being joined to and extending generally axially from the radially outermost portion of said disc part and having a free end portion spaced axially of said wheel remote from said radially outermost disc portion, the cross sectional thickness of at least a major portion of said rim portion being substantially uniform throughout the same, said rim part also having a radially in-turned flange portion at said one free end thereof extending convergently toward said disc portion at an acute angle to an imaginary plane that intersects the inboard surface of said flange portion and extends radially of said wheel perpendicular to the rotational axis of said wheel, said disc and rim parts being formed integrally as one piece from sheet metal, said rim portion extending generally axially in only one direction from the radially outermost portion of said disc part to said one free end portion so as to be cantilevered from said disc part, said disc part merging with said rim part integrally through a bend portion and extending radially inwardly therefrom to define three successively contiguous integral and annularly continuous disc zone portions consisting essentially of:

(a) a radially outermost generally frusto-conical face zone having air vent openings therein, said outermost face zone extending radially inwardly of said wheel in an outboard direction, (b) a radially innermost face zone defining an annular hat section protruding outboard of the wheel, and (c) a bolt circle mounting portion adapted for removable mounting of said wheel via wheel fastener means to a vehicle wheel mounting part.

2. The wheel as set forth in claim 1 wherein said radially in-turned flange angle ranges between about 45° to about 10°.

3. The wheel as set forth in claim 2 wherein said radially in-turned flange is curved in radial cross section such that the surface thereof facing inboard of the wheel is concave.

4. The wheel as set forth in claim 1 wherein the cross sectional thickness of said rim portion is generally less than that of said disc face zones.

5. The wheel as set forth in claim 1 further including a non-pneumatic elastomeric tire having a curved inner surface complimentarily matching and being bonded to said outermost surface of said rim portion and generally centered on and also being generally symmetrical about the arch apex of said toroidal rim portion, said tire having an outer face adapted for engagement with a supporting surface for the vehicle.

6. The wheel and tire combination as set forth in claim 5 wherein said tire comprises an annular body of resilient elastomeric material, said body consisting essentially of a generally cylindrical outer member at the outer periphery of said body, a generally cylindrical inner member spaced radially inward from and coaxial with said outer member, a plurality of axially extending, circumferentially spaced-apart first and second rib members connected at their corresponding inner and outer ends to said inner and outer cylindrical members, said rib members being generally inclined at substantially equal angles of about 15° to 75° to radial planes which intersect them at their inner ends, and a unitary circumferential web member having opposite side faces, said web member having its inner and outer peripheries connected respectively to said inner and outer cylindrical members, said web member being connected on one side face to said first rib members and on the other side face to said second rib members, said first rib members being inclined oppositely to said second rib members with respect to said radial planes, to thereby form with said inner and outer cylindrical members and said web member a load-carrying structure in which locally loaded members are enabled to buckle.

7. The wheel and tire of claim 6 wherein said web member is planar, is perpendicular to the rotational axis of the tire and is positioned about half way intermediate the axial ends of said cylindrical members, and wherein each of said rib members extends axially from the opposing side faces of said web member.

8. The wheel and tire of claim 7 wherein said first and second rib members are undercut at each end of each rib at least in the acute angle where said each rib joins said inner and outer cylindrical members.

9. The wheel and tire of claim 8 wherein said outer cylindrical member has secured to its outer surface a circumferential tread, and said inner cylindrical member has secured to its inner circumferential surface said wheel rim part.

10. The wheel and tire of claim 9 wherein said tread, said annular body, and said wheel rim part form an integral tire and wheel structure.

11. The wheel and tire of claim 10 wherein said elastomer is polyurethane.

12. The wheel as set forth in claim 1 wherein said radially in-turned flange is curved in radial cross section such that the surface thereof facing is concave, wherein the cross sectional thickness of said rim portion is generally less than that of said disc face zones and said in-turned flange portion has a cross sectional thickness generally greater than that of said rim portion.

13. The wheel as set forth in claim 12 wherein said in-turned flange portion generally progressively increases in cross sectional thickness in a direction radially inwardly of the wheel.

14. A support wheel for a vehicle comprising a vehicle mounting disc part and a tire-supporting rim part, said rim part having a radially outwardly arched rim portion of toroidal geometry, said rim portion toroidal geometry being defined by a radially outermost surface of said rim portion having a generally uniform radius of curvature taken in radial cross section in a plane incuding the axis of rotation of said wheel and being generally symmetrical about an apex of the arch of said toroidal rim portion, said rim part being joined to and extending generally axially from the radially outermost portion of said disc part and having a free end portion spaced axially of said wheel remote from said radially outermost disc portion, the cross sectional thickness of at least a major portion (48, 48' or C) of said rim portion being substantially uniform throughout the same, said rim part also having a radially in-turned flange portion (50, 50' or D) at said one free end thereof extending convergently toward said disc portion at an acute angle to an imaginary plane that intersects the inboard surface of said flange portion and extends radially of said wheel perpendicular to the rotational axis of said wheel, said disc and rim parts being formed integrally as one piece from sheet metal, said rim portion extending generally axially in only one direction from the radially outermost portion of said disc part to said one free end portion so as to be cantilevered from said disc part, said disc part merging with said rim part integrally through a bend portion and extending radially inwardly therefrom to define three successively contiguous integral and annularly continuous disc zone portions consisting essentially of:

(a) a radially outermost generally frusto-conical face zone (46, 46' or B) having air vent openings therein, said outermost face zone extending radially inwardly of said wheel in an outboard direction, (b) a radially innermost face zone (44, 44' or B) defining an annular hat section protruding outboard of the wheel, and (c) a bolt circle mounting zone portion (42, 42' or A) adapted for removable mounting of said wheel via wheel fastener means to a vehicle wheel mounting part, and wherein said rim and disc portions (42, 44, 46, 48 and 50) have cross sectional thickness dimensions in said disc zone portions and said rim and radially-in-turned flange portions generally proportioned relative to one another in a ratio established by utilizing the following cross sectional thickness disc zone portions dimension ranges, and relating the same to an overall wheel diameter dimension (Dϕ) of about 520 mm, and an overall axial width dimension (H) of about 117 mm and an overall axial width dimension (W) of said rim portion of about 71 mm:

(a) disc zone portion 42: 3.07 to 3.81 mm
(b) disc zone portion 44: 3.40 to 3.86 mm
(c) disc zone portion 46: 3.56 to 4.09 mm
(d) disc zone portion 48: 2.29 to 3.33 mm
(e) disc zone portion 50: 2.95 to 3.86 mm.

15. A support wheel for a vehicle comprising a vehicle mounting disc part and a tire-supporting rim part, said rim part having a radially outwardly arched rim portion of toroidal geometry, said rim portion toroidal geometry being defined by a radially outermost surface of said rim portion having a generally uniform radius of curvature taken in radial cross section in a plane including the axis of rotation of said wheel and being generally symmetrical about an apex of the arch of said toroidal rim portion, said rim part being joined to and extending generally axially from the radially outermost portion of said disc part and having a free end portion spaced axially of said wheel remote from said radially outermost disc portion, the cross sectional thickness of at least a major portion (48, 48' or C) of said rim portion being substantially uniform throughout the same, said rim part also having a radially in-turned flange portion (50, 50' or D) at said one free end thereof extending convergently toward said disc portion at an acute angle to an imaginary plane that intersects the inboard surface of said flange portion and extends radially of said wheel perpendicular to the rotational axis of said wheel, said disc and rim parts being formed integrally as one piece from sheet metal, said rim portion extending generally axially in only one direction from the radially outermost portion of said disc part to said one free end portions so as to be cantilevered from said disc part, said disc part merging with said rim part integrally through a bend portion and extending radially inwardly therefrom to define three successively contiguous integral and annularly continuous disc zone portions consisting essentially of:

(a) a radially outermost generally frusto-conical face zone (46, 46' or B) having air vent openings therein, said outermost face zone extending radially inwardly of said wheel in an outboard direction, (b) a radially innermost face zone (44, 44' or B) defining an annular hat section protruding outboard of the wheel, and (c) a bolt circle mounting zone portion (42, 42' or A) adapted for removable mounting of said wheel via wheel fastener means to a vehicle wheel mounting part, and wherein said rim and disc portions (42, 44, 46, 48 and 50) have cross sectional thickness dimensions falling generally in the following ranges:

(a) disc zone portion 42: 3.07 to 3.81 mm
(b) disc zone portion 44: 3.40 to 3.86 mm
(c) disc zone portion 46: 3.56 to 4.09 mm
(d) disc zone portion 48: 2.29 to 3.33 mm
(e) disc zone portion 50: 2.95 to 3.86 mm.

16. A method of making a support wheel for a vehicle having a vehicle mounting disc part and a tire-supporting rim part, said rim part having a radially outwardly arched rim portion of toroidal geometry, said rim portion toroidal geometry being defined by a radially outermost surface of said rim portion having a generally uniform radius of curvature taken in radial cross section in a plane including the axis of rotation of said wheel and being generally symmetrical about an apex of the arch of said toroidal rim portion, said rim part being joined to and extending generally axially from the radially outermost portion of said disc part and having a free end portion spaced axially of said wheel remote from said radially outermost disc portion, the cross sectional thickness of at least a major portion (48, 48' or C) of said rim portion being substantially uniform throughout the same, said rim part also having a radially in-turned flange portion (50, 50' or D) at said one free end thereof extending convergently toward said disc portion at an acute angle to an imaginary plane that intersects the inboard surface of said flange portion and extends radially of said wheel perpendicular to the rotational axis of said wheel, said disc and rim parts being formed integrally as one piece from sheet metal, said rim portion extending generally axially in only one direction from the radially outermost portion of aid disc part to said one free end portion so as to be cantilevered from said disc part, said disc part merging with said rim part integrally through a bend portion and extending radially inwardly therefrom to define three successively contiguous integral and annularly continuous disc zone portions consisting essentially of:

(a) a radially outermost generally frusto-conical face zone (46, 46' or B) having air vent openings therein, said outermost face zone extending radially inwardly of said wheel in an outboard direction, (b) a radially innermost face zone (44, 44' or B) defining an annular hat section protruding outboard of the wheel, and (c) a bolt circle mounting zone portion (42, 42' or A) adapted for removable mounting of said wheel via wheel fastener means to a vehicle wheel mounting part;

said method comprising the steps of:

(a) die forming a flat circular blank of sheet metal in a progressive die stamping operation to first form said disc zone portions to substantially final contour and cross sectional thickness with a residual annular outer peripheral margin of sheet metal surrounding said formed disc zone portions, (b) then spin forming said peripheral margin of said blank over a mandrel to shear spin form a generally cylindrical portion extending axially inboard from radially outermost disc zone, (c) then tipping radially inwardly of the wheel the inboard free edge of said cylindrical portion by spin forming the same against a contoured back-up mandrel to thereby form a radially inwardly extending flange portion, and (d) then free air spin forming said portion formed in step (c) to angle the same convergently toward the inboard face of said wheel disc part to thereby form said radially in-turned flange portion of said wheel rim part.

* * * * *